(12) United States Patent
Schneider et al.

(10) Patent No.: US 9,299,254 B2
(45) Date of Patent: Mar. 29, 2016

(54) DEVICE AND METHOD FOR WARNING A DRIVER OF A MOTOR VEHICLE

(75) Inventors: Marcus Schneider, Ludwigsburg (DE); Andrea De Sciscio, Cantalupa (IT)

(73) Assignee: ROBERT BOSCH GMBH, Stuttgart (DE)

( * ) Notice: Subject to any disclaimer, the term of this patent is extended or adjusted under 35 U.S.C. 154(b) by 124 days.

(21) Appl. No.: 14/125,260

(22) PCT Filed: Jun. 4, 2012

(86) PCT No.: PCT/EP2012/060506
§ 371 (c)(1),
(2), (4) Date: Mar. 19, 2014

(87) PCT Pub. No.: WO2012/168187
PCT Pub. Date: Dec. 13, 2012

(65) Prior Publication Data
US 2014/0218213 A1 Aug. 7, 2014

(30) Foreign Application Priority Data
Jun. 10, 2011 (DE) .......................... 10 2011 077 384

(51) Int. Cl.
*G08G 1/09* (2006.01)
*G08G 1/0967* (2006.01)
(Continued)

(52) U.S. Cl.
CPC .............. *G08G 1/0967* (2013.01); *B60Q 9/008* (2013.01); *G08G 1/166* (2013.01); *G08G 1/167* (2013.01)

(58) Field of Classification Search
CPC ................................ B60Q 9/008; G08G 1/167

USPC .................... 340/905, 425.5, 436, 438, 686.1
See application file for complete search history.

(56) References Cited

U.S. PATENT DOCUMENTS 4,694,295 A * 9/1987 Miller et al. .................. 340/903
6,377,167 B1 * 4/2002 Juds et al. ..................... 340/435
(Continued)

FOREIGN PATENT DOCUMENTS

CN          101522499      9/2009
DE     10 2004 016 024    10/2004
(Continued)

OTHER PUBLICATIONS

International Search Report for PCT/EP2012/060506, issued on Aug. 14, 2012.

*Primary Examiner* — Toan N Pham
(74) *Attorney, Agent, or Firm* — Kenyon & Kenyon LLP

(57) ABSTRACT

A method for warning a driver of a motor vehicle with the aid of a visual and/or audible warning signal (5), detection of an object taking place with the aid of a sensor which detects an angular field which opens opposite the driving direction of the motor vehicle and which is assigned to one side of the motor vehicle, and determination of at least one parameter related to the driving direction taking place with the aid of a control unit, an ascertainment being made as to whether a traffic situation exists which requires an immediate warning signal (5) with the aid of a decision-making algorithm which processes the at least one parameter related to the driving direction as an input, an immediate warning signal (5) being triggered if a situation requiring an immediate warning signal (5) exists, and ascertaining a delay period which is adjusted to the traffic situation, and triggering the warning signal (5) having the ascertained delay period if no traffic situation exists which requires an immediate warning signal (5).

22 Claims, 3 Drawing Sheets

(51) Int. Cl.
*G08G 1/16* (2006.01)
*B60Q 9/00* (2006.01)

(56) References Cited

U.S. PATENT DOCUMENTS

| | | | | |
|---|---|---|---|---|
| 6,753,766 | B2* | 6/2004 | Patchell | 340/436 |
| 6,927,677 | B2* | 8/2005 | Anderson et al. | 340/435 |
| 8,072,370 | B2* | 12/2011 | Woodington et al. | 342/70 |
| 8,564,425 | B2* | 10/2013 | Al-Jafar | 340/439 |
| 9,041,552 | B2* | 5/2015 | Yu | 340/905 |
| 2002/0011926 | A1 | 1/2002 | King | |
| 2003/0052773 | A1 | 3/2003 | Sjonell | |
| 2006/0006988 | A1 | 1/2006 | Harter et al. | |
| 2010/0181749 | A1 | 7/2010 | Sugimoto | |
| 2013/0044006 | A1* | 2/2013 | Chang et al. | 340/905 |

FOREIGN PATENT DOCUMENTS

| | | |
|---|---|---|
| DE | 10 2004 019 651 | 11/2005 |
| DE | 10 2006 002 662 | 8/2007 |
| DE | 102006047634 | 4/2008 |
| JP | 20099320 | 1/2009 |
| WO | WO01/45067 | 6/2001 |

* cited by examiner

DEVICE AND METHOD FOR WARNING A DRIVER OF A MOTOR VEHICLE

FIELD OF THE INVENTION

The present invention relates to a method for warning a driver of a motor vehicle with the aid of a visual and/or audible warning signal. The present invention furthermore relates to a device for carrying out the method.

BACKGROUND INFORMATION

United States Published Patent Appln. No. 2002/0011926 discloses a device for detecting objects which enter the area of the blind spot of a vehicle during travel. For this purpose, the device essentially uses a system of transmitters which emit a circularly polarized signal, and receivers which receive the echo of this signal. If a turn signal is activated and another vehicle is detected in the vehicle's blind spot, a warning signal is triggered at the side mirror and/or the interior rear-view mirror. If a vehicle having the device passes another vehicle while using the turn signal, a warning is triggered as soon as the passed vehicle enters the blind spot.

United States Published Patent Appln. No. 2006/0006988 discloses a warning indication system which warns drivers of objects in the blind spot of a vehicle with the aid of a luminous display. The warning indication system is connected to a sensor system which indicates to the warning indication system that there are objects in a monitoring area. The warning indication system detects whether the vehicle is expected to change lanes with the aid of a lane change detection routine. The sensor system and the lane change detection routine pass their results to the warning indication system as input values. The warning indication system calculates parameters from these input values, for example, luminosity values, with which the luminous display is controlled, thus generating an adjusted warning signal to be provided to the driver.

Warning systems according to the related art have the disadvantage of triggering warnings in various traffic situations which may be perceived by the driver of a motor vehicle as being incorrect or annoying. For example, if a driver passes another motor vehicle and receives a warning when the passed motor vehicle enters the blind spot, this warning is perceived to be superfluous. Furthermore, a warning signal generated during a passing maneuver distracts the driver and is thus detrimental to traffic safety. On the other hand, if warning signals are triggered with a delay, the driver has a reduced reaction time in critical traffic situations, for example, when changing lanes. Drivers tend to interpret a delayed warning as a malfunction in the warning device and become accustomed to ignoring the apparently unreliable warning device. The effectiveness of warning systems in enhancing traffic safety is therefore diminished.

SUMMARY

The method according to the present invention for warning a driver of a motor vehicle with the aid of a visual and/or audible warning signal includes the following steps:
a) detecting an object using a sensor which detects an angular field which opens opposite the driving direction of the motor vehicle and which is assigned to one side of the motor vehicle,
b) determining at least one parameter related to the driving direction with the aid of a control unit,
c) ascertaining whether a traffic situation requiring an immediate warning signal exists, with the aid of a decision-making algorithm which processes the at least one parameter related to the driving direction as an input,
d) triggering an immediate warning signal if a traffic situation exists which requires an immediate warning signal, or ascertaining a delay period which is adjusted to the traffic situation and triggering the warning signal having the ascertained delay period if no traffic situation exists which requires an immediate warning signal.

The method according to the present invention allows the identification of the existing traffic situation, thus making it possible to decide whether the driver should be warned. If the driver is warned, a decision is also made as to the delay with which the warning signal is given. The driver is therefore only given warnings which are considered to be relevant. The warning signals given to the driver are classified as relevant; thus, the driver does not become accustomed to ignoring the warning system due to apparently faulty operation. The method according to the present invention thus increases the effectiveness of warning systems in enhancing traffic safety.

In one specific embodiment of the present invention, an activity signal of a direction indicator of the motor vehicle, which is generally referred to as the turn signal, may be used as a parameter related to the driving direction. In another specific embodiment of the present invention, a deflection angle of a steering wheel of the motor vehicle may be used as a parameter related to the driving direction. Since a turn signal is per se used for indicating an intention of changing the driving direction, its activity signal is a parameter related to the driving direction whose evaluation does not require any further analysis. Furthermore, detecting an activity signal of a turn signal is easy to implement and is an advantageous specific embodiment in terms of cost. The deflection angle of a steering wheel is just as simple to determine and is always permanently linked to a change in the driving direction. The use of the deflection angle of the steering wheel is a simple specific embodiment which may be implemented in a cost-efficient manner.

Furthermore, the decision-making algorithm may include a control loop with the aid of which continuously variable delay periods may be ascertained for a detected traffic situation. Control loops may be implemented with the aid of simple electronic components and constitute a robust technical approach. Furthermore, control loops may be designed in such a way that a continuously changing input value generates a continuously changing output value. The use of a control loop allows the precise adjustment of the method according to the present invention with respect to the delay period to specifications which, for example, may stem from safety considerations or convenience requirements.

In another specific embodiment of the present invention, the decision-making algorithm includes a table. It is possible to effect discretely variable delay periods using the table. If the table is implemented in the form of a data memory in the warning system, it is then possible to make subsequent changes to the values stored in it. Changes to the warning method are thus possible; for example, experience obtained may be incorporated in order to improve the warning system. The option of making subsequent changes prolongs the product life cycle.

In one specific embodiment of the present invention, an object is detected on one side of the motor vehicle. The object passes the motor vehicle and is detected in the blind spot of the motor vehicle. If the turn signal is activated on the same side on which the object is detected, a delay of the warning signal is suppressed. If a driver intends, for example, to turn right (correspondingly reversed when driving on the left) or to change to another lane, another approaching motor vehicle in the blind spot poses a hazard. In such a traffic situation, it is essential to provide an immediate warning to the driver. The method according to the present invention identifies this critical traffic situation and ensures that an immediate warning is provided to the driver which is appropriate to the situation.

In another specific embodiment of the method according to the present invention, an object is detected on one side of the motor vehicle. The object is passed by the motor vehicle and is detected in the blind spot of the motor vehicle. If the turn signal is simultaneously deactivated on the same side on which the object is detected, a long delay in the warning signal is effected. When passing another motor vehicle, the passed vehicle is located in the blind spot of the passing vehicle. In this situation, the driver is aware of the passed vehicle, and a warning only distracts the driver from traffic events in this situation. The method according to the present invention recognizes that the turn signal on the side on which the passed motor vehicle is located is inactive, and that the traffic situation is non-critical. The method according to the present invention avoids distracting the driver in a non-critical situation. The long delay with which the warning signal is triggered also provides the driver with feedback indicating that the warning system functions and has identified the passed vehicle. The driver is thus assured that the warning system operates reliably, thereby keeping the driver from classifying it as erroneous and growing accustomed to ignoring the warning system.

Furthermore, the method according to the present invention may include detection of the one object in the blind spot on one side of the motor vehicle. The object is passed by the motor vehicle. If the turn signal is simultaneously activated on the same side on which the object is detected, a reduced delay period is effected. In traffic situations such as completing a passing maneuver, the driver thus receives a warning of a potential hazard due to the other motor vehicle. The delayed warning signal also avoids immediately distracting the driver, which poses a greater hazard in such a situation. In traffic situations of this kind, the method according to the present invention provides a warning only if the warning itself is no longer capable of creating a hazard. Furthermore, the driver becomes accustomed to warning signals always being issued at an appropriate point in time. The driver's acceptance of the warning system is thus increased, thereby improving the effectiveness of the warning system in enhancing traffic safety.

In one specific embodiment of the present invention, multiple parameters related to the driving direction are processed simultaneously when ascertaining the delay period with the aid of a decision-making algorithm. The use of multiple parameters related to the driving direction allows a differentiated assessment of the traffic situation using the decision-making algorithm. In addition to simple traffic situations which, for example, may be analyzed with the aid of a parameter related to the driving direction, the evaluation of multiple parameters simultaneously makes it possible to ensure that the driver is warned efficiently even in atypical traffic situations. For example, if the activity signal of the turn signal and the deflection angle of the steering wheel are evaluated, it is possible to give the deflection angle of the steering wheel priority over the activity signal of the turn signal. For example, when changing lanes while the turn signal is not activated, it is thus possible to give a warning signal to the driver.

Furthermore, the present invention relates to a device which includes a sensor system which includes at least one sensor which is attached to the exterior of the motor vehicle. The sensor is assigned to one side of the motor vehicle in order to monitor an angular area and to detect the entry of objects into the angular area. Furthermore, the device has a control unit which is connected to the at least one sensor in order to relay values of parameters related to the driving direction of the motor vehicle. The device includes a warning unit for outputting visual and/or audible warning signals. The control unit is designed in such a way as to give a warning signal having a delay, the duration of the delay being a function of an evaluation result of a decision-making algorithm of at least one parameter related to the driving direction.

DETAILED DESCRIPTION

Figure 1:
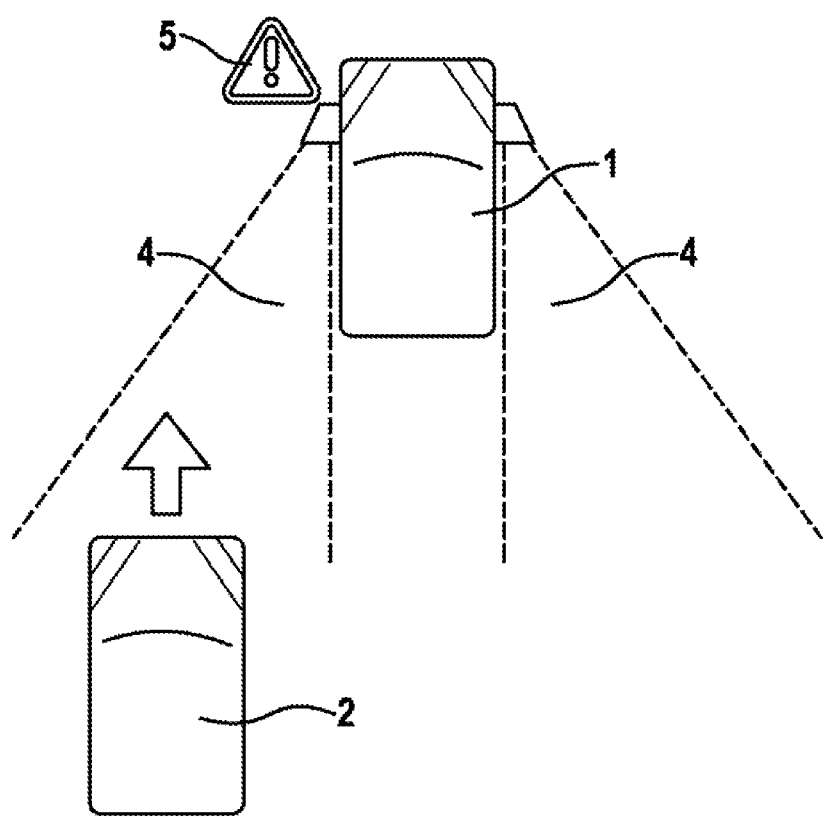
FIG. 1 shows a schematic representation of a passing motor vehicle having a known blind spot warning system and its operating method.

FIG. 1 schematically illustrates a blind spot warning system and its operating method according to the related art. A motor vehicle 1 is passed by a second motor vehicle 2. First motor vehicle 1 has a sensor system which detects an angular area 4 which opens opposite the driving direction. The sensor system is attached symmetrically on both sides of first motor vehicle 1 so that two angular areas 4 are detected. If second motor vehicle 2 enters the detected angular area, a warning signal 5 is issued to the driver, in this case with the aid of a visual warning in the area of the exterior rear-view mirror, thus warning of the second motor vehicle.

Figure 2:
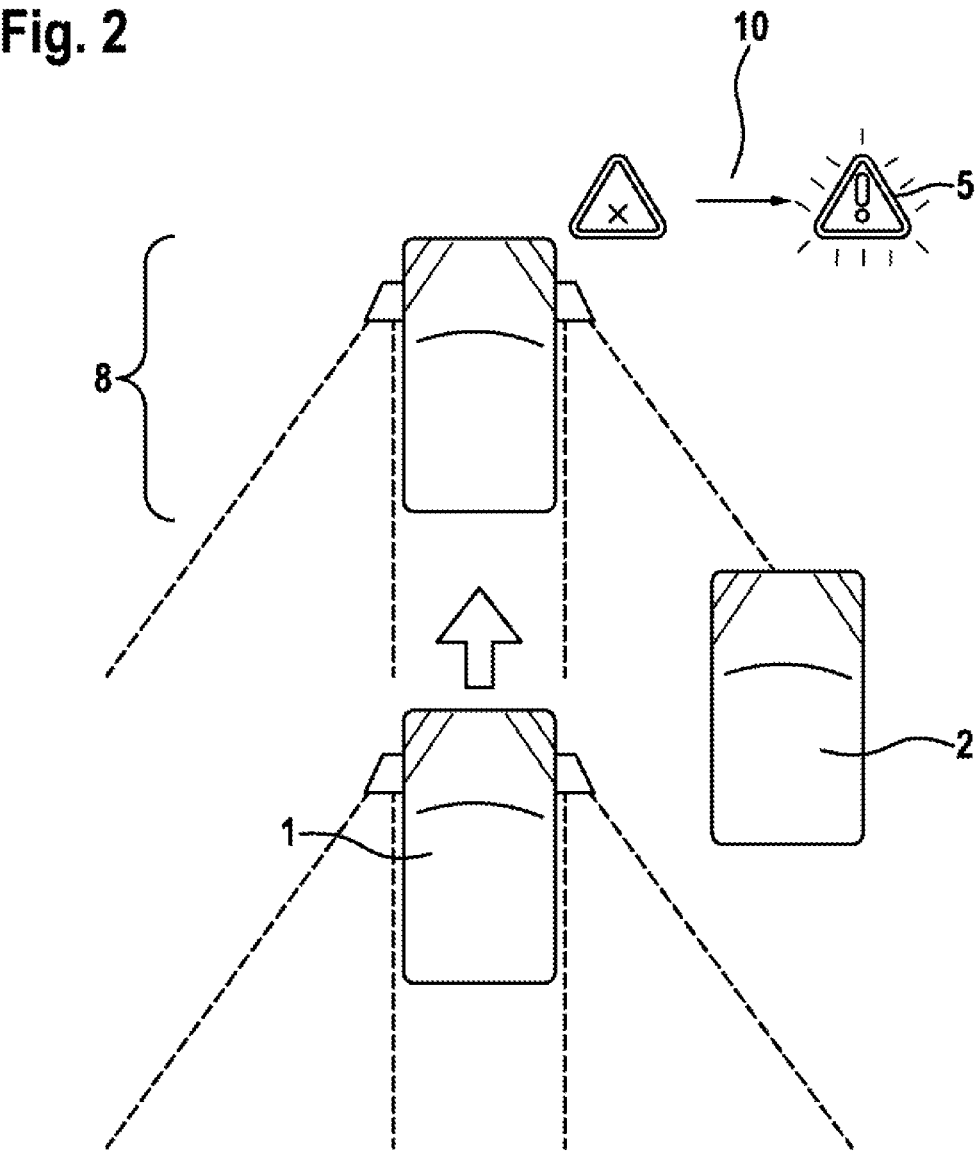
FIG. 2 shows a schematic representation of a passed motor vehicle having a known blind spot warning system and its operating method.

FIG. 2 schematically illustrates a blind spot warning system and its operating method according to the related art. Here, a first motor vehicle 1 passes a second motor vehicle 2. A sensor system detects angular areas which each have an angular field which opens opposite the driving direction. Furthermore, the sensor system is situated symmetrically on both sides of the first motor vehicle. During the passing maneuver in which first motor vehicle 1 passes second motor vehicle 2, the second motor vehicle enters a detected angular area of the sensor system. Motor vehicle 2 is detected and the associated information is relayed to a control unit which is not illustrated here. The control unit ascertains a delay period 10 of approximately 1 second from the information. If delay period 10 has elapsed, a warning signal 5 to the driver is triggered. During delay period 10, first motor vehicle 1 travels a distance relative to second motor vehicle 2, so that warning signal 5 to the driver of first vehicle 1 is triggered if second motor vehicle 2 has essentially already been passed. First motor vehicle 1 is subsequently located in a position 8 which is offset with respect to the second vehicle.

Figure 3:
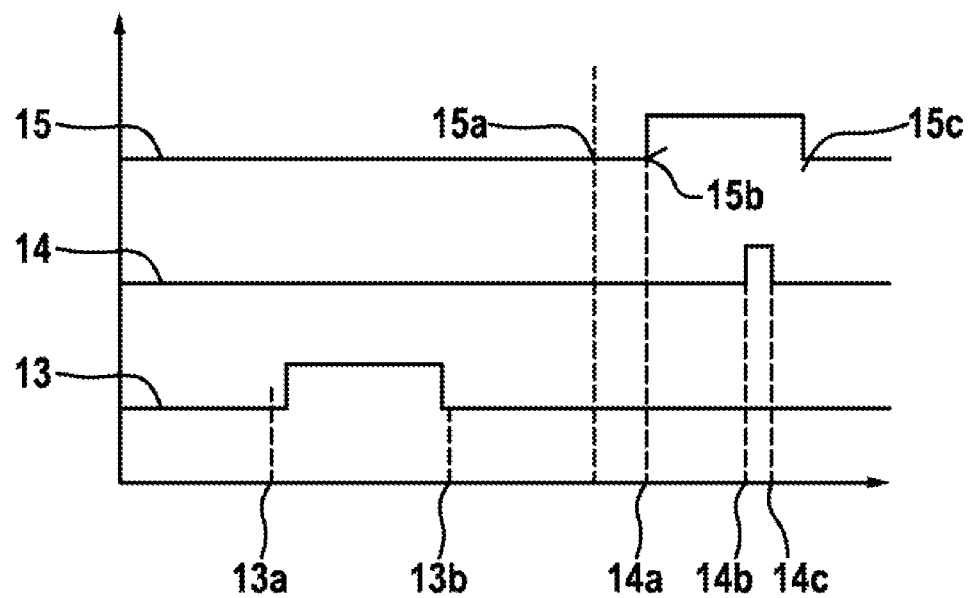
FIG. 3 shows a flow chart of the method according to the present invention in qualitative comparison to known operating methods for blind spot warning systems.
Figure 3:
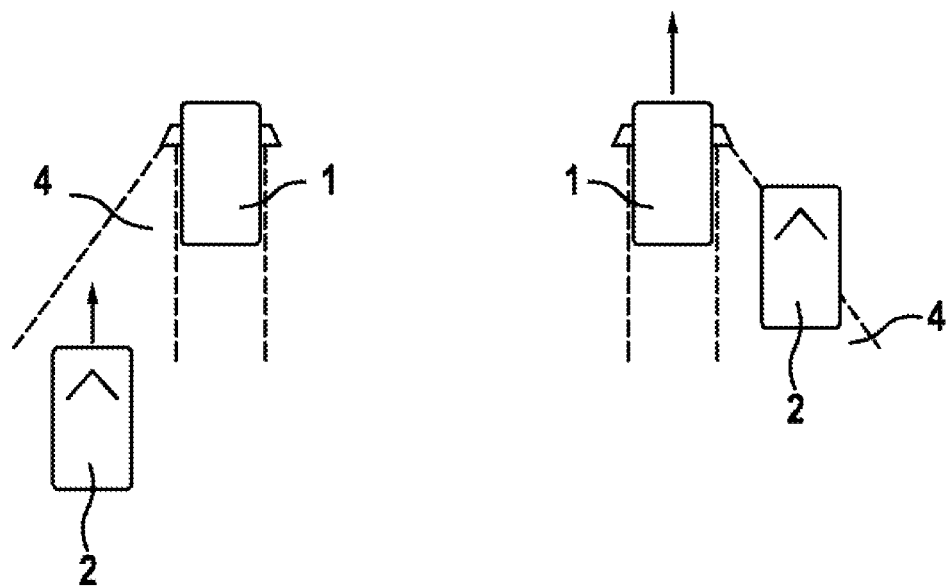

FIG. 3 depicts a flow chart of the method according to the present invention in the form of a graph in comparison with the operating methods of the blind spot warning systems from the related art as shown in FIGS. 1 and 2. The horizontal axis is a time axis and the vertical axis is an activity axis. A vertical upward jump of the curve represents an activation of warning signal 5 to the driver, while a vertical downward jump represents a deactivation of warning signal 5.

In a first curve 13, the activity of warning signal 5 during a complete passing maneuver according to FIG. 1 is depicted. The passing maneuver includes three time intervals. In a first time interval, in the graph, the area between the vertical axis and the starting point of passing maneuver 13a, second motor vehicle 2 is located outside angular area 4, which the sensor system of first motor vehicle 1 detects. During this time interval, warning signal 5 is deactivated. Upon reaching the starting point of passing maneuver 13a, second motor vehicle 2 enters detected angular area 4 of first motor vehicle 1. According to the operating method of a blind spot warning system depicted in FIG. 1, warning signal 5 to the driver is essentially activated immediately after this entry, as depicted by the vertical upward jump in the graph.

In a second time interval which lies between the starting point of passing maneuver 13a and an end point of passing maneuver 13b, warning signal 5 to the driver remains activated. At the end point of passing maneuver 13b, second motor vehicle 2 leaves detected area 4 of first motor vehicle 1. This causes warning signal 5 to the driver to be deactivated at the end point of passing maneuver 13b. In the following third time interval, second motor vehicle 2 is located outside detected area 4 of first motor vehicle 1, and the passing maneuver is completed. In the passing procedure according to curve 13, both motor vehicles 1, 2 are located close to each other after second motor vehicle 2 enters the blind spot of first motor vehicle 1, which would create a hazardous situation if the first vehicle changes lanes, of which the driver of first motor vehicle 1 should be warned. A delay-free warning to the driver of first vehicle 1 is required to ensure the highest possible level of traffic safety.

In a second curve 14, the activity of warning signal 5 during a complete passing maneuver according to FIG. 2 is depicted. Here, the passing maneuver essentially includes four time intervals. In a first time interval, in the graph, the area between the vertical axis and the starting point of passing maneuver 14a, second motor vehicle 2 is located outside angular area 4 detected by the sensor system of first motor vehicle 1. Warning signal 5 to the driver is deactivated. At the starting point of passing maneuver 14a, second motor vehicle 2 enters detected angular area 4 of first motor vehicle 1 and is detected. A second time interval, which lies between the starting point of passing maneuver 14a and a starting point of a warning 14b, follows the detection at the starting point of passing maneuver 14a. During the second time interval, warning signal 5 to the driver remains deactivated, the second time interval corresponding to delay period 10 according to FIG. 2. When the starting point of warning 14b is entered, warning signal 5 to the driver is activated. This is followed by a third time interval, which lies between the starting point of warning 14b and the end point of maneuver 14c, during which warning signal 5 to the driver remains activated. When the end point of maneuver 14c is entered, second motor vehicle 2 leaves detected angular area 4 of first motor vehicle 1 and warning signal 5 to the driver is deactivated. In the following fourth time interval, second motor vehicle 2 is located outside detected angular area 4 of first motor vehicle 1 and the passing maneuver is completed. While performing a driving maneuver according to curve 14, the driver of first motor vehicle 1 has typically been aware of second motor vehicle 2 from the beginning. Furthermore, second motor vehicle 2 enters the blind spot of first motor vehicle 1 if both motor vehicles 1, 2 move away from each other. This does not result in a hazardous situation. The driver of first motor vehicle 1 receives a delayed warning and is thus not initially distracted from the traffic situation. The warning is then issued at a non-critical point in time in order to assure the driver of first motor vehicle 1 that the warning device functions reliably.

In a third curve 15, the flow of the method according to the present invention for operating a blind spot warning system is depicted using the example of a passing maneuver. Here, the passing maneuver essentially includes four time intervals. In a first time interval, which lies in the area between the vertical axis and the starting point of passing maneuver 15a, second motor vehicle 2 is located outside detected angular area 4 of first motor vehicle 1. First motor vehicle 1 has a higher speed than second motor vehicle 2 and a turn signal is activated on one side of the first motor vehicle. In the first time interval, warning signal 5 to the driver is deactivated. At the starting point of passing maneuver 15a, second motor vehicle 2 enters detected angular area 4 of first motor vehicle 1 and is detected. In a second time interval, which lies between the starting point of passing maneuver 15a and the starting point of warning 15b, warning signal 5 to the driver remains deactivated. Here, the second time interval corresponds to delay period 10. When the starting point of warning 15b is entered, warning signal 5 to the driver is triggered. In a third time interval, which lies between the starting point of warning 15b and an end point of maneuver 15c, warning signal 5 to the driver remains activated. When the end point of maneuver 15c is entered, warning signal 5 is deactivated. In the time interval following the end point of maneuver 15c, second motor vehicle 2 is located outside detected angular area 4 of first motor vehicle 1, and the passing maneuver is completed. In a driving maneuver according to curve 15, it is anticipated that a non-critical driving situation, namely, passing second motor vehicle 2, may become critical. A critical traffic situation occurs if the passing of second motor vehicle 2 by first motor vehicle 1 is followed by a lane change in the direction of second motor vehicle 2 and possibly a delay of first motor vehicle 1. A delay of first motor vehicle 1 may be due to a turning maneuver. A critical situation results, of which the driver should be effectively warned. A small delay period increases traffic safety in such a situation.

What is claimed is:

1. A method for warning a driver of a motor vehicle with at least one of a visual warning signal and an audible warning signal, comprising:
    detecting an object using a sensor which detects an angular field which opens opposite a driving direction of the motor vehicle and which is assigned to one side of the motor vehicle;
    determining at least one parameter related to the driving direction with a control unit;
    ascertaining whether a traffic situation requiring an immediate warning signal exists, with a decision-making algorithm which processes the at least one parameter related to the driving direction as an input; and
    performing one of:
        triggering the immediate warning signal if the traffic situation exists which requires the immediate warning signal, and
        ascertaining a delay period that is adjusted to the traffic situation and triggering the warning signal having the ascertained delay period if no traffic situation exists which requires the immediate warning signal.

2. The method for warning the driver of the motor vehicle as recited in claim 1, wherein the at least one parameter related to the driving direction is an activity signal of a turn signal of the motor vehicle.

3. The method of warning the driver of the motor vehicle as recited in claim 1, wherein the at least one parameter related to the driving direction is a deflection angle of a steering wheel of the motor vehicle.

4. The method for warning the driver of the motor vehicle as recited in claim 1, wherein the decision-making algorithm includes a control loop by which continuously variable delay periods are effected.

5. The method for warning the driver of the motor vehicle as recited in claim 1, wherein the decision-making algorithm includes a table by which discretely variable delay periods are effected.

6. The method for warning the driver of the motor vehicle as recited in claim 1, wherein detection of an object which is passed by the motor vehicle in a blind spot on one side of the motor vehicle while a turn signal is simultaneously activated on the same side of the motor vehicle effects a suppressed delay of the warning signal.

7. The method for warning the driver of the motor vehicle as recited in clam 1, wherein detection of an object which is passed by the motor vehicle in a blind spot on one side of the motor vehicle while a turn signal is simultaneously deactivated on the same side of the motor vehicle effects a long delay of the warning signal.

8. The method for warning the driver of the motor vehicle as recited in claim 1, wherein detection of an object which is passed by the motor vehicle in a blind spot on one side of the motor vehicle while a turn signal is simultaneously activated on the same side of the motor vehicle effects a reduced delay of the warning signal.

9. The method for warning the driver of the motor vehicle as recited in claim 1, wherein ascertaining the delay of the warning signal with at least one parameter related to the driving direction is able to simultaneously process multiple parameters related to the driving direction with one of the decision-making algorithm and a table.

10. The method for warning the driver of the motor vehicle as recited in claim 1, wherein the following is performed:
triggering the immediate warning signal if the traffic situation exists which requires the immediate warning signal.

11. The method for warning the driver of the motor vehicle as recited in claim 1, wherein the following is performed:
ascertaining the delay period that is adjusted to the traffic situation and triggering the warning signal having the ascertained delay period if no traffic situation exists which requires the immediate warning signal.

12. A blind spot warning system for warning a driver of a motor vehicle, comprising:
a sensor system that includes at least one first sensor on an exterior of the motor vehicle and is assigned to one side of the motor vehicle to monitor an angular area outside the motor vehicle and to detect an entry of objects into the angular area;
a control unit connected to the at least one first sensor in order to relay values of parameters related to a driving direction of the motor vehicle; and
a warning unit for issuing at least one of a visual warning and an audible warning, wherein the control unit is able to give a warning signal having a delay, a duration of the delay being a function of an evaluation result of at least one parameter related to the driving direction of the motor vehicle;
wherein the control unit is configured to ascertain whether a traffic situation requiring an immediate warning signal exists, with a decision-making algorithm which processes the at least one parameter related to the driving direction as an input, and
wherein the control unit is configured to perform one of:
triggering the immediate warning signal if the traffic situation exists which requires the immediate warning signal, and
ascertaining a delay period that is adjusted to the traffic situation and triggering the warning signal having the ascertained delay period if no traffic situation exists which requires the immediate warning signal.

13. The system as recited in claim 12, wherein the at least one parameter related to the driving direction is an activity signal of a turn signal of the motor vehicle.

14. The system as recited in claim 12, wherein the at least one parameter related to the driving direction is a deflection angle of a steering wheel of the motor vehicle.

15. The system as recited in claim 12, wherein the decision-making algorithm includes a control loop by which continuously variable delay periods are effected.

16. The system as recited in claim 12, wherein the decision-making algorithm includes a table by which discretely variable delay periods are effected.

17. The system as recited in claim 12, wherein detection of an object which is passed by the motor vehicle in a blind spot on one side of the motor vehicle while a turn signal is simultaneously activated on the same side of the motor vehicle effects a suppressed delay of the warning signal.

18. The system as recited in claim 12, wherein detection of an object which is passed by the motor vehicle in a blind spot on one side of the motor vehicle while a turn signal is simultaneously deactivated on the same side of the motor vehicle effects a long delay of the warning signal.

19. The system as recited in claim 12, wherein detection of an object which is passed by the motor vehicle in a blind spot on one side of the motor vehicle while a turn signal is simultaneously activated on the same side of the motor vehicle effects a reduced delay of the warning signal.

20. The system as recited in claim 12, wherein ascertaining the delay of the warning signal with at least one parameter related to the driving direction is able to simultaneously process multiple parameters related to the driving direction with one of the decision-making algorithm and a table.

21. The system as recited in claim 12, wherein the following is performed:
triggering the immediate warning signal if the traffic situation exists which requires the immediate warning signal.

22. The system as recited in claim 12, wherein the following is performed:
ascertaining the delay period that is adjusted to the traffic situation and triggering the warning signal having the ascertained delay period if no traffic situation exists which requires the immediate warning signal.

* * * * *